(12) United States Patent
Swarztrauber

(10) Patent No.: US 7,673,118 B2
(45) Date of Patent: Mar. 2, 2010

(54) SYSTEM AND METHOD FOR VECTOR-PARALLEL MULTIPROCESSOR COMMUNICATION

(76) Inventor: Paul N. Swarztrauber, 9392 E. Quarry Trail, Scottsdale, AZ (US) 85262-2306

( * ) Notice: Subject to any disclaimer, the term of this patent is extended or adjusted under 35 U.S.C. 154(b) by 0 days.

(21) Appl. No.: 11/445,021

(22) Filed: Jun. 1, 2006

(65) Prior Publication Data
US 2006/0218375 A1 Sep. 28, 2006

Related U.S. Application Data

(63) Continuation-in-part of application No. 10/365,089, filed on Feb. 12, 2003, now abandoned.

(51) Int. Cl.
*G06F 15/76* (2006.01)
(52) U.S. Cl. .......... 712/10; 712/12
(58) Field of Classification Search .......... 712/10, 712/12
See application file for complete search history.

(56) References Cited

U.S. PATENT DOCUMENTS

| | | | |
|---|---|---|---|
| 4,349,870 A * | 9/1982 | Shaw et al. ........... 712/38 |
| 4,598,400 A | 7/1986 | Hillis |
| 4,805,091 A | 2/1989 | Thiel et al. |
| 4,814,973 A | 3/1989 | Hillis |
| 5,485,627 A | 1/1996 | Hillis |
| 5,530,809 A | 6/1996 | Douglas et al. |
| 5,535,408 A | 7/1996 | Hillis |
| 5,561,768 A | 10/1996 | Smith |
| 5,590,283 A | 12/1996 | Hillis et al. |
| 5,689,722 A | 11/1997 | Swarztrauber |
| 5,887,138 A | 3/1999 | Hagersten et al. |
| 5,923,894 A * | 7/1999 | Sollars ........... 712/38 |
| 6,044,449 A * | 3/2000 | Garg et al. ........... 712/23 |
| 6,145,072 A | 11/2000 | Shams et al. |
| 6,151,598 A * | 11/2000 | Shaw et al. ........... 707/3 |
| 6,219,775 B1 | 4/2001 | Wade et al. |
| 6,292,018 B1 | 9/2001 | Kean |
| 6,298,448 B1 * | 10/2001 | Shaffer et al. ........... 713/322 |
| 6,334,177 B1 | 12/2001 | Baumgartner et al. |

(Continued)

OTHER PUBLICATIONS

Duato, J.; Lopez, P.; Silla, F.; Yalamanchili, S., "A high performance router architecture for interconnection networks ," Parallel Processing, 1996., Proceedings of the 1996 International Conference on, vol. 1, No., pp. 61-68 vol. 1, Aug. 12-16, 1996.*

(Continued)

*Primary Examiner*—Aimee J Li
*Assistant Examiner*—William B Partridge
(74) *Attorney, Agent, or Firm*—Woods Oviatt Gilman LLP

(57) ABSTRACT

This present invention brings to the multiprocessor what vectorization brought to the single processor. It provides similar tools to speed communication that have traditionally been used to speed computation; namely, the capability to program optimal communication algorithms on an architecture that can replicate their performance in terms of wall clock time. In addition to the usual complement of logic and arithmetic units, each processor contains a programmable communication unit that orchestrates traffic between the network and registers that communicate directly with comparable registers in neighboring processors. Communication tasks are performed out of these registers like computational tasks on a vector uniprocessor. The architecture is balanced and the hardware/software combination is scalable to any number of processors.

22 Claims, 4 Drawing Sheets

U.S. PATENT DOCUMENTS

| | | | |
|---|---|---|---|
| 6,370,145 | B1 | 4/2002 | Dally et al. |
| 6,510,509 | B1 * | 1/2003 | Chopra et al. .................. 712/13 |
| 6,701,424 | B1 | 3/2004 | Liao et al. |
| 6,728,862 | B1 | 4/2004 | Wilson |
| 6,757,761 | B1 | 6/2004 | Smith et al. |
| 6,769,056 | B2 | 7/2004 | Barry et al. |
| 6,789,173 | B1 | 9/2004 | Tanaka et al. |
| 6,892,291 | B2 | 5/2005 | Pechanek et al. |
| 6,898,657 | B2 | 5/2005 | Smith |
| 6,901,491 | B2 | 5/2005 | Kohn et al. |
| 6,934,283 | B1 | 8/2005 | Warner |
| 6,957,318 | B2 | 10/2005 | Emberson et al. |

OTHER PUBLICATIONS

Swarztrauber, Paul N., "The Communication Machine," International Journal of High Speed Computing, vol. 12, No. 1(2004), pp. 69-82.

Swarztrauber, Paul N. and Hammond, Steven W., "A comparison of optimal FFTs on torus and hypercube multicomputers," Parallel Computing, 27 (2001), pp. 847-859.

Swarztrauber, Paul N.,"Transposing Arrays on Multicomputers Using de Bruijn Sequences," Journal of Parallel and Distributed Computing, 53 (1998), pp. 63-77.

Swarztrauber, Paul N., "The Vector Multiprocessor," International Journal of High Speed Computing, vol. 11, No. 1 (2000) p. 37-53, World Scientific Publishing Company.

Saad, Youcef and Schultz, Martin H., "Data Communication in Hypercubes," Research Report Oct. 1985,Center for Scientific Computing, Yale University, Journal of Parallel and Distributed Computing 6, (1989), pp. 115-135.

Stout, Quentin F. and Wagar, Bruce, "Intensive Hypercube Communication: Prearranged Communication in Link-Bound Machines," Department of Electrical Engineering and Computer Science, University of Michigan, Sep. 7, 1988.

Bertsekas, D.P., Ozveren, C., Stamoulis, G.D., Tseng, P., Tsitsiklis, J.N., "Optimal Communication Algorithms for Hypercubes," Journal of Parallel and Distributed Computing, 11 (1991), pp. 263-275.

Swarztrauber, Paul N., "The Vector parallel paradigm," Advanced Mathematics: Computations and Applications, pp. 675-687, 1995 NCC Publisher.

Johnsson, S. Lennart, Ho, Ching-Tien, "Optimal communication channel utilization for matrix transposition and related premutations on binary cubes," Discrete Applied Methematics 53 (1994), pp. 251-274.

HPCwire<hpcmore@news.hpcwire.com>, Cray's Adaptive Supercomputing—A Paradigm Shift, Christopher Lazou Hi Per Com Consultants, Ltd., Mar. 24, 2006.

* cited by examiner

Exhibit B

SYSTEM AND METHOD FOR VECTOR-PARALLEL MULTIPROCESSOR COMMUNICATION

CROSS-REFERENCE TO RELATED APPLICATIONS

This application is a Continuation-in-part of previously filed non-provisional application Ser. No. 10/365,089, filed on Feb. 12, 2003 now abandoned.

TECHNICAL FIELD

The present invention is related to the field of general purpose supercomputer architectures; in particular, to massive multiprocessor systems and data transfers both within and between the processors of such systems.

BACKGROUND OF THE INVENTION

Since the advent of computing, the time required to access data from memory has steadily increased relative to the computational processing time. Vector processors were developed in the 1970s to minimize the load/store time between processors and memory for repetitive computations by performing the computation in an assembly line manner. With the advent of multiprocessor architectures in the late 80s, processor speed and local memory access were markedly faster than communication between processors, which completely dominated total compute time.

During the late 80s and 90s several companies were established to further the idea of combining the power of emerging microprocessors into a single "supercomputer." Of particular interest was the Connection Machine (CM) that was built by Thinking Machines Inc.; Hillis (U.S. Pat. No. 4,598,400), Theil, et al. (U.S. Pat. No. 4,805,091), (U.S. Pat. No. 4,814,973), Hillis (U.S. Pat. No. 5,535,408), Hillis (U.S. Pat. No. 5,590,283), and Wade et al. (U.S. Pat. No. 6,219,775). The CM demonstrated the feasibility of a supercomputer based on a massive number of processors but fell victim to what will be referred to as the "Communication Problem" that is discussed below. On paper the CM had a very impressive "peak" speed but in practice the machine would achieve less than single digit efficiency as measured by the ratio of computation to communication time. To date, efficiency has not improved for a number of reasons that will be discussed in further detail below. Primarily, this lack of efficiency is because communication speed has not kept pace with processor speeds. Consider the recent quote in the March 2006 issue of the High Performance Wire newsletter by the Chief Technical Officer (CTO) at Cray Inc.:

". . . but as it is widely recognized, when scientific computing migrated to commodity platforms, interconnect performance, both in terms of bandwidth and latency, became the limiting factor on overall application performance and remains a bottleneck to this day."

Steve Scott, CTO of Cray, In HPCwire, 24 Mar., 2006

This statement was made to explain Cray's shift to building special purpose computers outside the "commercial off-the-shelf" (COTS) framework. This is a remarkable shift by the company whose name has been synonymous with general purpose supercomputing. Nevertheless it is a reasonable shift considering the extent of the communication "bottleneck.".

Turning to the particular problems facing existing multiprocessor supercomputer systems, an understanding of the general nature and utilization of the systems is required. Multiprocessor systems are comprised of a number of interconnected processors. The largest and most powerful systems are often referred to as supercomputers. Supercomputers are used for the most computation demanding applications such as weather prediction. These applications are distributed across the interconnected processors by assigning a portion of the overall computation task to each processor. However, to complete even a portion of the overall computation, each processor must communicate intermediate results to other processors. The communication among the processors adversely affects the performance of a multiprocessor for a number of reasons. Specifically, a first issue arises even in the communication of a two processor system, wherein performance is adversely affected because the off-chip communication between the processors is generally much slower than on-processor computation.

A second issue relates to having an increased numbers of processors participating in the multiprocessor. Essentially, it rapidly becomes impractical to directly connect all processors to all other processors. As such, communication between any two or more processors is likely to be routed through intermediate processors, further degrading communication speed by at least a factor equal to the number of processors on the route.

A third issue relates to the fact that data must be routed to all processors in parallel to support the parallel computation for which such supercomputer systems are designed. That is, to compute in parallel, all processors must be able to receive data simultaneously. Simultaneous data receipt leads to further degradation of communication because of possible contention or the blocking of transmissions by other transmissions.

A fourth issue relates to blocking and other such contention for resources. To eliminate blocking and otherwise optimize performance, transmissions must be scheduled. Depending on the overall system design, transmission scheduling may require additional time. System software and protocols are utilized to implement schedules that require real time transmission and decoding of the schedule and destination addresses, further contributing to an overall degradation in performance.

A fifth issue relates to the shear number of processors in a particular multiprocessor system. As the number of processors increases, there is a corresponding increase in the physical system size. The physical size increase also increases signal distance and transmission time within the multiprocessor.

A sixth issue relates to system imbalances, which result in idle circuitry (i.e., an under utilization of all the available resources). Examples of imbalances include mismatched local and global communication speeds and/or mismatched communication and computation speeds. The effect of such imbalances is to delay or idle certain system components until the slower components complete their tasks.

A seventh issue further relates to the complexity of the network as processor numbers increase. Fixed off-chip bandwidth has to be shared between an increasing number of channels thereby reducing the individual channel bandwidth.

An eighth issue is that the use of cache and resulting coherency communication associated with shared memory can substantially increase the resources of the multiprocessor that are dedicated to communication.

In light of the issues discussed above, one can understand why it is possible for performance to decrease with increasing numbers of processors. The increased communication between the additional processors requires more time than the decrease in computation time. An architecture/computation that yields such results or effects is said to lack scalability.

The magnitude of the communication problem is evident in multiple processor supercomputers where communication likely consumes 90% or more of the total compute time, resulting in a decrease of overall computing performance of such supercomputers. As such, in light of the foregoing problems there exists a need for a system and method, to address the relatively poor performance of multiprocessor systems despite the increase in processor and memory speeds. Specifically, there exists a need to provide a solution to the communication delay among processors in a multiprocessor environment.

There exists a further need to provide a scalable multiprocessor system wherein overall performance of the multiprocessor system will increase in relative and direct proportion to the number of individual component processors. In sum, the magnitude of the communication problem as earlier described, justifies an effort in both circuitry and software that is comparable to the effort that has been made over the years to improve computation. Indeed, every multiprocessor computational task has an underlying communication task, thus a solution to the "Communication Problem" would have a wide spread and significant impact on future multiprocessor performance. It is intuitive that the performance we ultimately seek will come in the form of multiprocessors with truly massive numbers of processors.

SUMMARY OF THE INVENTION

The present invention is directed to a system and method of minimizing communication time and developing a scalable hardware/software combination such that optimal performance can be realized in a general purpose multiprocessor having processor counts in the millions, billions and beyond. The system and method of the present invention incorporates a programmable on-processor communication unit in addition to the traditional complement of logic and arithmetic units found in traditional processors that are incorporated into massive multiprocessor systems. The system and method of the present invention provides a communication enhanced processor for use in massive multiprocessor systems.

BRIEF DESCRIPTION OF THE DRAWINGS

The present invention is further described with reference to the accompanying drawings, which show a particular construction of the present invention. However, it should be noted that the invention as disclosed in the accompanying drawings is illustrated by way of example only. The various elements and combinations of elements described below and illustrated in the drawings can be arranged and organized differently to result in constructions which are still within the spirit and scope of the present invention.

DETAILED DESCRIPTION OF THE INVENTION

The present invention is directed to a system and method to enhance communications within and among processors in a massive multiprocessor system. The present invention provides hardware and software that is configured to enable programming of communication algorithms. Optimal algorithmic performance can be replicated in terms of multiprocessor wall clock time. The present invention provides scalable performance that is not compromised, even as the number of processors is dramatically increased. More specifically, the present invention pertains to the development of an enhanced processor that includes a programmable communication unit that performs communication tasks out of a C-register like computational tasks are performed out of vector registers. The communication unit of the present invention orchestrates traffic between the network of processors and the C-register. The C-register communicates directly with comparable registers in neighboring processors. The processor also contains the traditional CPU units that can perform computational or logical tasks immediately following the completion of a communication task.

A C-register as used herein is addressable memory akin to a vector register and provides to communication what vector register provides to vector computation/processing. A C-register 201 is like a vector register in that the length of the C-register 201 may be chosen to be as long as possible, preferably a value greater than P. The C-register is available to a CPU for vector computations. A C-register can communicate directly to other c-registers on neighboring processors.

The invention is hereinafter described with reference to the accompanying drawing Figures and one or more exemplary embodiments. It should be understood that the description herein is for illustrative purposes only and is in no way intended to limit or otherwise confine the invention to the specific embodiment or disclosed steps, procedures or components.

Figure 1:
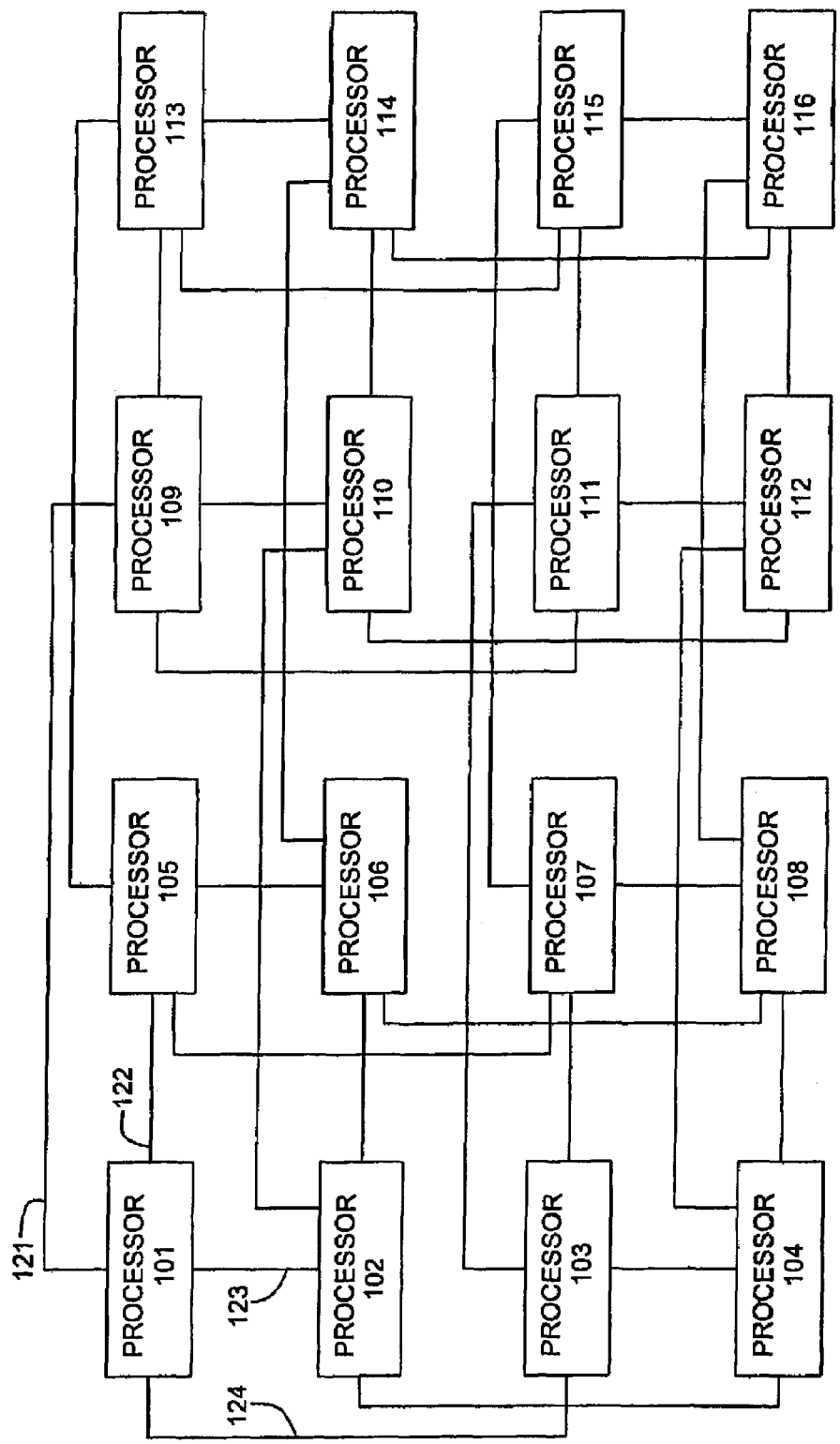
FIG. 1 illustrates a hypercube network interconnect for a sixteen processor system according to an embodiment of the present invention.

Referring to the drawings, there is shown in FIG. 1, an illustrative 16 processor multiprocessor system 100 with a preferred hypercube interconnect. The processors are numbered 101-116. The number of processors 101-116 has been selected for exposition only, concepts described herein and the present invention as a whole would also be applicable to an embodiment having millions, billions or more processors. The processors 101-116 could each be on a separate chip or more likely there could be multiple processors 101-116 on a single chip. According to the method of the interconnect, there are a number of connections from any one processor to other processors. The connections are assumed bi-directional with wires illustrated by lines in FIG. 1. It should be understood that the illustrated embodiment of FIG. 1 is a schematic drawing, and as such the connections between processors convey the desired information, where-as the physical placement of the schematic processor blocks on the page does not affect the hypercube interconnect as long as the illustrated connections are maintained in a hypercube format for embodiment having a hypercube technology. In an embodiment of the present invention, each processor 101-116 has a port for interconnecting to neighboring processors. For example, and as shown, the ports 121, 122, 123, 124 of processor 101 provide connectivity to individual processors 102, 103, 105 and 109.

The multiprocessor network of the present invention may be expanded, for example to 256 processors by embedding FIG. 1 into a like Figure with each processor 101, 102, 103, 104, and so forth, replaced with 16 processors. The individual channels 121, 122, 123, 124, and so forth, are replaced with 16 channels that are connected one each to the processors in FIG. 1 for a total of 8 connections (ports) to each processor. The number of processors can be further increased, in a recursive manner, by additional embeddings In general, a P processor hypercube has $\log_2 P$ bidirectional connections per processor. Hypercube connections are conventional and well known. The maximum (peak) speed of a P processor system is P times the speed of the individual processor; however, as previously indicated, current actual performance of a multiprocessor hypercube or other interconnection schemes are typically less than 10% of peak.

Parallel computation must be sustained by parallel communication. Ideally this would be achieved by direct connections between all processors 101-116. However, with increasing number of processors P, such connections rapidly become impractical to fabricate. Interconnection theory provides how best to simulate all-to-all connections with fewer connections. The simplest and most popular are the one- two- and three-dimensional mesh networks. The present invention is based on a hypercube network, wherein communication is programmable at the level of individual channels. This permits the implementation of optimal communication algorithms and eliminates issues of network contention, deadlock and register overflows.

According to the present invention, communication tasks may be performed at an average rate of one data from every processor to their destination processor on every communication cycle. This is true even though the data must pass through intermediate processors to reach its destination. Although an individual data may require several cycles to reach its destination, in the same time other data also may reach their destination and hence the average result of one or more per communication cycle. In other words, communication tasks may be performed in a parallel/vector-like manner.

The terms "average" and "vector-like" require explanation. The use of the word "average" is usually associated with multiprocessor performance which is nondeterministic because of a host of factors associated with automatic routing and rerouting. These factors are eliminated here. Each transmission is defined as well as its cycle number and channel. (SWARZTRAUBER, Paul N. "Transposing Arrays on Multicomputers Using de Bruijn Sequences," Journal of Parallel and Distributed Computing, 53 (1998), pgs. 63-77). However, the number of elements that arrive at their destination processor may vary from cycle to cycle during the task and is therefore considered more intuitive to present an "average" number for the task. For example, the general communication task which consists of P processors transmitting an element to all other processors requires exactly P/2 communication cycles. Therefore an average of 2(P–1)/P elements arrive per cycle. To simplify exposition, this has been presented as an "average of one or more" elements arriving in every processor on every cycle.

Although overall performance of a communication task is the same, or better, than the single vector processor, the data may not arrive in the original sequence and therefore performance is described as "vector-like." In addition, the number of elements that arrive at their destination processor may vary from cycle to cycle during the task. For example, during the execution of the general communication task, one element arrives at its destination (in all processors) on the first cycle and $\log_2 P$ elements arrive on the last cycle. However, communication is deterministic and, as stated, the overall task is completed in exactly P/2 communication cycles. Vector performance, or better, is obtained; however implementation is "vector-like."

Most communication in a multiprocessor environment must be routed through intermediate processors, because 'direct' connections do not exist between all the individual processors. The collection of the communication routes and transmission timings is called a schedule. The schedule depends on both the network and the communication task. The schedule is provided by the communication algorithm and specifies the data that is to be transmitted on each wire or channel and on each communication cycle. Optimum schedules exist for the most common of communication tasks such as that which is required for the fast Fourier transform (FFT) see for example, (Swarztrauber, P. N. and Hammond, S. W., "A Comparison of Optimal FFTs on Torus and Hypercube Multicomputers," Parallel Computing, 27 (2001) pgs. 847-859).

The present invention introduces tools to speed communication; namely, algorithms and hardware that support the optimal implementation of the algorithms. For a large class of communication tasks, routes or schedules can be found such that, on average, useful data arrives at all processors 101-116 on every communication cycle. By "useful" data we mean data that has arrived at its destination rather than some intermediate processor along its route. Optimal communication algorithms will be discussed, by example, later in this section.

Turning initially to the hardware component, the present invention provides hardware that is required to translate the scalability of the algorithms into a scalable hardware/software multiprocessor. That is, hardware that translates algorithmic performance into hardware "wall clock time."

Figure 2A:
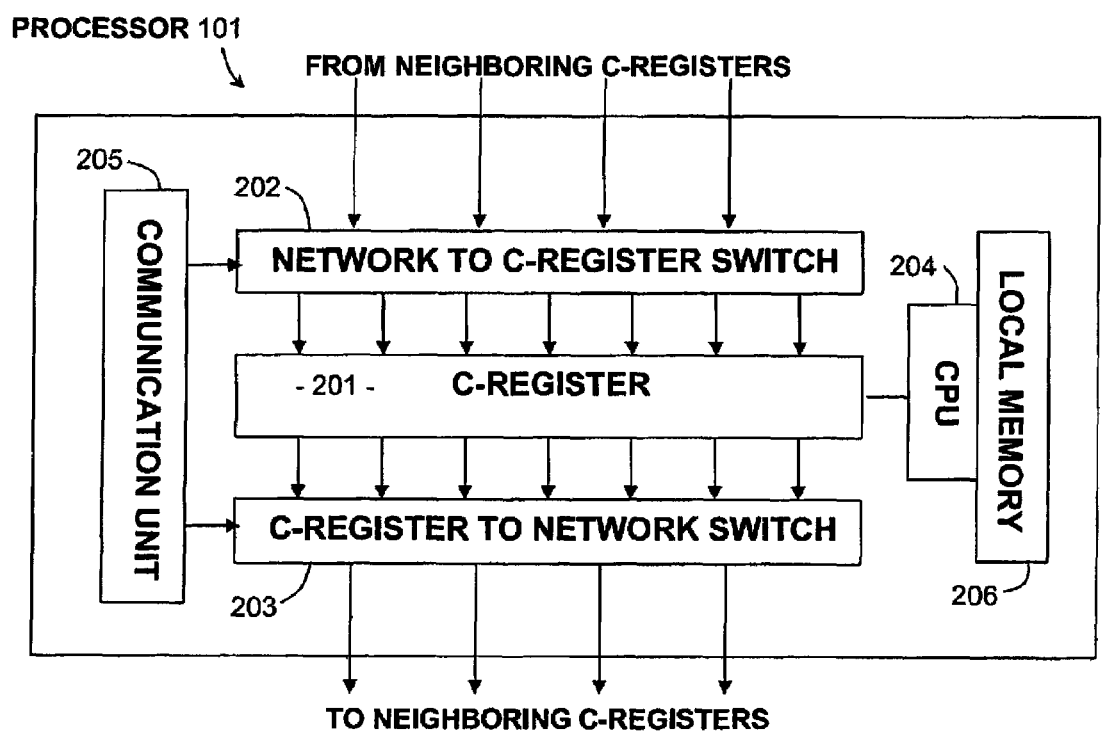
FIG. 2A illustrates a block diagram of some components in an exemplary processor of the present invention, the exemplary processor having a programmable 5 communication unit, a C-register, switches, local memory, and the usual arithmetic/Boolean central processing unit (CPU)

FIG. 2A illustrates components that are included in any one of the processors 101-116 of FIG. 1. Specifically, the processor 101 illustrated in FIG. 2 includes a CPU 204 with traditional arithmetic and Boolean units (not shown) as well as local memory 206. The local memory 206 contributes to the total memory of the multiprocessor system 100. In other words, massive memory size is achieved via the utilization of massive numbers of processor 101. Importantly, the processor 101 includes a communication unit 205, a C-register 201, a network-to-register demultiplexer switch 202 and a register-to-network multiplexer switch 203.

The communication unit 205 orchestrates network traffic by setting the switches 202, 203 as needed. The communication unit 205 is programmed to set switches 202, 203 to implement new configurations during each communication cycle of the processor 101. The switch setting configurations provided by the communication unit 205 may be dynamically computed at runtime or be static information that is loaded from a data store, such as memory 206. Communication tasks are performed out of the C-register 201. The C-register 201 is connected directly via the switches 202, 203 to neighboring C-registers in other processors 102, 103, 105 and 109 on the network. Contextually, the C-register of the present invention provides to communication what a vector register provides to vector computation.

Figure 2B:
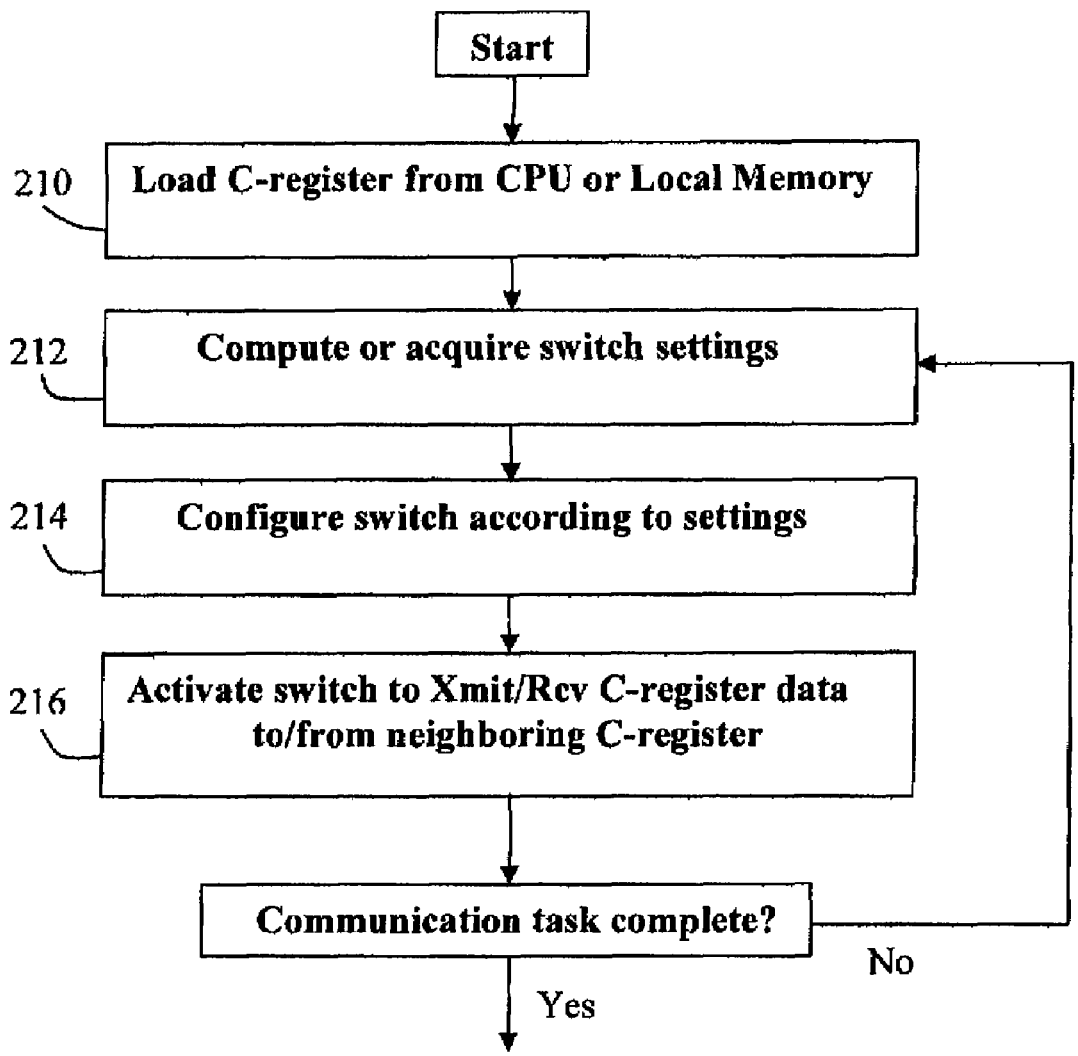
FIG. 2B is a diagram illustrating an exemplary logic flow for a communication event in the processor of FIG. 2A.

In operation and as illustrated in FIG. 2B, a communication task in the present invention may begin with the loading of the C-register 201 from local memory 206 via the CPU 204, as shown at step 210. The programmable communication unit 205 may either execute algorithms in real time to determine settings for the switches 202, 203 or obtain previously stored settings, as shown at step 212. The communication cycle continues with the setting of the switches 202, 203 by the communication unit 205, at step 214. The switches are then activated at step 216 to cause the transmission of data onto the network from the C-register 201. More specifically, data is transmitted to similar registers in neighboring processors. Subsequent transmissions are concurrent with the resetting of the switches 202, 203. As the cycles proceed, the content of the C-register 201 evolves from transient to resident data, at which time the cycles are terminated. Much like a vector register, the length of the C-register 201 may be chosen to be as long as possible, preferably a value greater than P, the number of processors utilized in the multiprocessor system. Also like the vector registers on a uni-processor, the communication cycles may have to be repeated to complete the communication task. Following the completion of the communication task, the C-register 201 may be available to the CPU 204 for vector computations.

In an embodiment of the present invention, the fundamental communication instruction is of the form:

TRRC IP RCA TCA

Where TRRC is the transmit/receive instruction and IP is one of the $\log_2 P$ ports. RCA is the C-Register address of the received data and TCA is the C-register address of the transmitted data. The communication unit must execute up to $\log_2 P$ of these instructions, one for each port IP and set the switches 202, 203 for each communication cycle. The C-register addresses RCA, TCA, may be obtained from the optimum schedule (method) for the communication task. In an embodiment, the schedule configuration permits the retransmission of transient data in the optimum time of a single communication cycle.

In one aspect, the system and method of the present invention addresses the concern with slow off-processor communication relative to on-processor speed. Specifically, the present invention minimizes the number of off-chip transmissions that occur before data is available for computation, as described above. Data is extracted from the network much like data is extracted from memory for subsequent vector processing in uniprocessor environments. In route or transient data may be forwarded back on the network on subsequent communication cycles. Advantage is taken of the difference in communication and processor speed to set the on-chip switches for dynamic settings.

In another aspect the present invention addresses network contention. Programmable communication is provided at the level of the individual wire or channel. 20 This also avoids the problem of deadlock and register overflow and permits the implementation of optimal communication algorithms that "hide" latency. In a further aspect, parallel communication is provided in support of parallel computation. Where it is algorithmically possible, programmable communication at the level of the individual wire insures parallel communication to all processors on each communication cycle.

In yet another aspect, the present invention addresses the issue of network overhead that is associated with hardware routing. The implementation of low level programmable communication eliminates headers, protocols, and communication overhead that is traditionally required by a hardware router.

In an even further aspect, the present invention provides system balance. Since Off-processor communication remains the slowest component of the system, the present invention utilizes the time duration of the off-processor event to perform on-chip fine grain dynamic switching. The speed of the CPU, and local memory are chosen as some multiple of the speed at which data can be retrieved from the network. Performance ultimately then depends on the number of processors rather than the speed of the individual processor.

In another aspect, the present invention addresses the issue of fixed pin count in multiprocessors. Channel bandwidth in a multiprocessor having P processors is determined by the number of communication pins L on a processor divided by the $\log_2 P$. Maximum performance is achieved with each channel corresponding to a single pin and P=2 L processors. Current pin counts are anticipated to reach one thousand in 2008. Maximum performance would therefore be achieved if a hypercube channel corresponds to a single pin, which suggests processor count of $P=2^{1000}$ However, such a fabrication is currently not feasible and therefore each channel is designed to correspond to multiple pins. It is interesting to note that maximum performance is ultimately obtained by many processors with less individual channel bandwidth rather than fewer processors with greater bandwidth. (Swarztrauber, P. N., "The Communication Machine," International Journal of High Speed Computing, 12 (2004) page 75).

In a further aspect, the present invention eliminates the extra communication that is induced by maintaining cache coherency in existing systems. This problem is eliminated because the memory of the present invention is local and reaches massive proportions as a result of the massive numbers of processors similar to computation proportions. Local memory also eliminates the problems relating to the growing number of memory banks associated with large shared memory. It has been said that the real reason for parallel computing is "locality."

In an even further aspect, the present invention provides scalability of the hardware/software combination. The architecture described herein will scale in proportion to the algorithm. For example, if the multiprocessor communication algorithm scales in proportion to the number of processors P then hardware/software performance will also increase in proportion to P.

We turn now to the algorithmic and software component of the invention, which will be presented by an example of a "transpose" or "corner turning" communication task implemented on a hypercube. Assume there is a two dimensional P×P array $x_{i,j}$ that is distributed column wise across P processors. That is, $x_{i,j}$ is located in processor j for all i. A common communication task is to redistribute the array row wise so that $x_{i,j}$ is now located in processor i for all j. The optimal algorithm or schedule for a transpose will be illustrated by example. Consider the transpose of an 8×8 array xi,j that is distributed across eight processors, p=0 to 7, as shown in FIG. 3A.

Figures 3A, 3B:
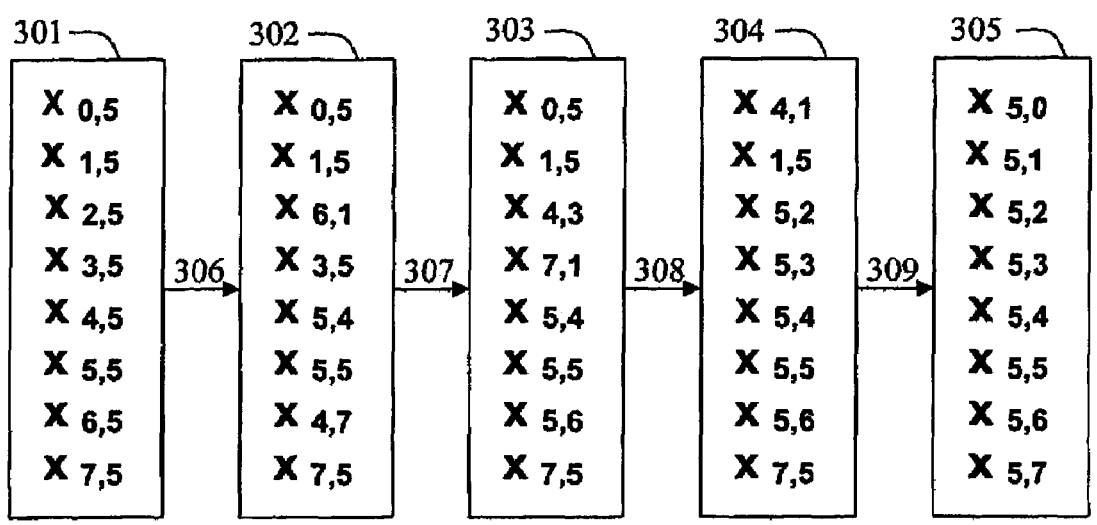
FIG. 3B illustrates the evolution of a C-register in processor p=5 during the execution of the transpose of an 8×8 array that is distributed column-wise across 8 processors, as illustrated in FIG. 3A.

FIG. 3B displays the contents of the c-register corresponding to processor p=5, which is chosen at random during each of four communication cycles 306, 307, 308, 309 of the transpose. The leftmost box 301 corresponds to the original contents or the 5th column from FIG. 3A. After four communication cycles 306, 307, 308, 309 the rightmost box 305 of the processor p=5 contains the fifth row of the array. A similar figure could be displayed for the pth column located in processor p for p=0 through p=7. A closer look at each box in FIG. 3B reveals that three elements are replaced on each communication cycle 306-309 corresponding to elements received from three neighboring processors of an eight processor hypercube network. On each cycle, the elements that are replaced are also transmitted to neighboring processors.

A total of 64 elements are routed across the hypercube network to their destination in the same time that it takes to transmit 4 elements on a single wire. In general P2 elements reach their destination in P/2 cycles for an average of 2P elements per communication cycle. Therefore the communication system and method of the present invention scales linearly with respect to P for any P.

In the present invention, the speed of all components on the processor 101 may be based on the communication cycle. Thus, the speed of the entire system, including the C-register 201, local memory 206, and the CPU 204 components are balanced with respect to one another. Performance of the multiprocessor 100 depends on the massive numbers of processors 101-116 that it comprises, rather than the speed of an individual processor that may have been designated for central control of the processors 101-116, as is the current practice. Prior art systems such as U.S. Pat. No. 5,689,722, entitled "Multipipeline Multiprocessor System", focused on the efficient implementation of processor to processor communication but do not teach a communication component for each constituent processor or the integration of same, 5 into a balanced scalable system.

Conventional control of communication in a multiprocessor system is by a distinct uniprocessor as presented in Emberson (U.S. Pat. No. 6,957,318) or Hillis (U.S. Pat. No. 4,598,400). However in a "multicomputer" embodiment of the present invention there is distributed control. Instructions are distributed over the network via a broadcast tree that can be defined on a hypercube from any single processor 101-116 to all other processors 101-116. Such an embodiment provides a framework in which the processors 101-116 can be partitioned to work on subtasks. This manner of control is now generally accepted in the context of multiple computers on the Tera Grid, Global Grid, or more simply, on the Web.

The hypercube network of the multiprocessor 100 of the present invention, provides enhanced inter-processor communications, in parallel and provides performance that scales in proportion to algorithmic performance. Nevertheless, the present invention can be configured and implemented in any network of multiple processors. Communication at the level of the individual wire or channel provides a generalized processor that can be embedded in any network topology. For example, the four-ported processor of FIG. 2 may be embedded in a 16-node hypercube, a two dimensional mesh, or a one dimensional ring. In the latter case, the bandwidth of the channels would double because they would have access to double the number of pins.

In each case the communication unit 205 would execute a different program corresponding to different optimal algorithms for the different network topologies. Such processors may also be embedded in non-homogeneous networks constructed as combinations of conventional homogeneous networks. Pin set A can be programmed to correspond to neighbor B on the network. In this way, processor 101 provides general purpose communication for COTS network applications.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

What is claimed is:

1. A multiprocessor system comprising:
a network having a network topology; and
a plurality of processors, each of said plurality of processors internally comprising:
a central processing unit (CPU) including integer, scalar, floating point, and Boolean units;
a local memory;
a first and a second multi-ported network switch;
an addressable C-register adapted for holding both transient and resident data items, said C-register connected to other C-registers located in neighboring processors for providing parallel communication between said C-register and said other C-registers via said first and second multi-ported network switches, said C-register is available for use by said central processing unit during vector computations upon completion of communication tasks and wherein communications between said C-registers occurs without accessing said local memory or said central processing unit; and
a programmable communication unit;
said network switches having $\log_2 P$ ports to the network;
said plurality of processors interconnected in the network for collaborative task execution;
said communication unit providing one or more dynamic switch configuration settings to said first and second multi-ported switches on each communication cycle of a communication task thereby providing vector-like communications among said plurality of processors, wherein on average one data item is communicated to its destination processor in every communication cycle;
said CPU, local memory, and said communication unit coupled and configured to provide computations and vector-like communication tasks, utilizing said addressable C-register located within each of said plurality of processors.

2. The multiprocessor system of claim 1, wherein said first multi-ported network switch is a multiplexer, said multiplexer configurable to transfer data from the addressable C-register to the network, and wherein said second multi-ported network switch is a demultiplexer, said demultiplexer configurable to transfer data from the network to the addressable C-register.

3. The multiprocessor system of claim 2, wherein said network topology is a hypercube network.

4. The multiprocessor system of claim 3, wherein there are P count of said plurality of processors, said demultiplexer and said multiplexer each having $N=\log_2 P$ ports both to and from the network and M ports to and from said C-register, wherein M is the number of locations in said C-register.

5. The multiprocessor of claim 2 having a massive memory, wherein the massive memory is the sum of the local memory within each of the plurality of processors.

6. The multiprocessor of claim 5 having no cache.

7. The multiprocessor of claim 2, further comprising a broadcast tree for distributing control over the network, said broadcast tree being defined from each processor to all other processors.

8. The multiprocessor of claim 4 further comprising:
a plurality of communication pins;
a plurality of communication channels; and
wherein each of said communication channels may utilize a multiple of said communication pins.

9. A method in a multiprocessor system for providing communication among a plurality of P processors interconnected in a network, the method comprising:

providing internal to each of said plurality of processors, a central processing unit (CPU) including integer, scalar, vector floating point, and Boolean units, a local memory, an addressable C-register, a multi-ported demultiplexer, a multi-ported multiplexer and a programmable communication unit;

providing connectivity between each of said multiplexer and said demultiplexer, to said network on $N=\log_2 P$ ports, and to said C-register on M ports, wherein said C-register has M locations;

configuring said communication unit to provide one or more switch settings for said multiplexer and demultiplexer on each communication cycle of a communication task thereby providing vector-like communications among said plurality of P processors;

utilizing said addressable C-register for transient and resident data store; and configuring said CPU, local memory, and said communication unit to provide computation and vector-like communication tasks among said plurality of processors, whereby data is transferred in parallel and without reference to said local memory between the C-registers of said plurality of processors via said multiplexer and said demultiplexer, which are resettable on each communication cycle.

10. The method of claim 9, further comprising correlating by said communication unit, the execution of one or more transfer-receive communication instructions with the configuration of said demultiplexer and multiplexer, whereby once a first addressable C-register is loaded, data transfers to other C-registers of said plurality of processors without reference to said local memory.

11. The method of claim 10, further comprising balancing the network by selecting the speed of local memory, C-register, and the central processing unit (CPU) based on the speed of the network.

12. The method of claim 9, further comprising configuring said multiplexer and demultiplexer switches to implement a new switch configuration during each communication cycle in response to a set of communication instructions received from said communication unit.

13. The method of claim 12, wherein said new switch configuration is dynamically determined by said communication unit on each communication cycle.

14. The method of claim 9, wherein global communication tasks are performed at an average rate of at least one data per communication cycle, in parallel, to all destination processors.

15. The method of claim 9 further comprising, availing the contents of said C-register for vector computation by said central processing unit (CPU), retransmission to neighboring processors, or storage in said local memory.

16. The method of claim 9 further comprising, providing deterministic performance rather than statistical by eliminating unknown performance factors including, contention, deadlock, and register overflow.

17. The method of claim 9 wherein the communication performance of the multiprocessor scales in proportion to the performance of the algorithm.

18. The method of claim 9 further comprising, providing a plurality of communication channels and a plurality of c communication pins capable of supporting a network with $P=2^c$ processors.

19. The method of claim 9, further comprising distributing control over the network via a broadcast tree that is defined from each of said plurality of processors to all others of said plurality of processors.

20. A method for communicating between a plurality of processors comprising:

providing internal to each of the plurality of processors a central processing unit (CPU), local memory, a communication unit, a C-register and one or more network switches;

providing a parallel communication path between a first C-register located in one of the plurality of processors and one or more other C-registers located in one or more neighboring processors, via said one or more network switches;

communicating instructions between the CPU and said first C-register for a communication task;

providing switch settings from the communication unit to said one or more network switches on each communication cycle of said communication task to provide vector-like communications among said plurality of processors;

transferring data between the local memory and said first C-register at the beginning of a first communication cycle of said communication task;

communicating the data between said first C-register and said one or more other C-registers utilizing said one or more switches during subsequent communication cycles without reference to the local memory or the CPU; and said first C-register and said one or more other C-registers available to said CPU during vector computations on completion of said communication task;

said first C-register having a length L chosen to be a value preferably greater than the number of processors P in the multiprocessor system.

21. The method of claim 20, further comprising simultaneously communicating the data between said first C-register and two or more C-registers located in neighboring processors.

22. A multiprocessor apparatus having a plurality of interconnected communication enhanced processors each of said plurality of communication enhanced processors internally comprising:

a processing means for performing communication tasks;
a local data storage means;
means for handling both transient and resident data items;
means for orchestrating parallel communications between neighboring enhanced processors, wherein datum arrives at its destination processor at an average rate of one or more per communication cycle; and
means for selectively directing communication data;
wherein said means for performing communication tasks passes data to and from said local data storage means; and
wherein said orchestrating means provides configuration information to said communication data directing means to enable data items to be sent from/received by, said data holding means, to/from neighboring enhanced processors
wherein said parallel communication between neighboring enhanced processors occurs without accessing said local data storage means or said processing means;
wherein said orchestrating means provides dynamic configuration settings to said communication data directing means on each communication cycle of a communication task and thereby provides vector-like communication among said plurality of communication enhanced processors.

* * * * *